(12) United States Patent
Asano et al.

(10) Patent No.: US 9,038,454 B2
(45) Date of Patent: May 26, 2015

(54) THERMAL FLOWMETER

(75) Inventors: Satoshi Asano, Hitachi (JP); Masahiro Matsumoto, Hitachi (JP); Hiroshi Nakano, Naka-gun (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 294 days.

(21) Appl. No.: 13/814,855

(22) PCT Filed: Sep. 6, 2011

(86) PCT No.: PCT/JP2011/070222
§ 371 (c)(1),
(2), (4) Date: Feb. 7, 2013

(87) PCT Pub. No.: WO2012/043164
PCT Pub. Date: Apr. 5, 2012

(65) Prior Publication Data
US 2013/0145840 A1   Jun. 13, 2013

(30) Foreign Application Priority Data

Sep. 30, 2010   (JP) ................................ 2010-220248

(51) Int. Cl.
*G01F 1/68*    (2006.01)
*G01F 1/69*    (2006.01)
(Continued)

(52) U.S. Cl.
CPC ................ *G01F 1/69* (2013.01); *G01F 1/6845* (2013.01); *G01F 1/692* (2013.01)

(58) Field of Classification Search
CPC .......... G01F 1/6845; G01F 1/69; G01F 1/692
USPC ........................................ 73/204.25, 204.11
See application file for complete search history.

(56) References Cited

U.S. PATENT DOCUMENTS 6,470,742 B1 * 10/2002 Yamakawa et al. ........ 73/204.26
6,536,274 B1    3/2003 Zushi et al.
(Continued)

FOREIGN PATENT DOCUMENTS

| JP | 2000-213973 A | 8/2000 |
| JP | 2001-041790 A | 2/2001 |

(Continued)

OTHER PUBLICATIONS

PCT International Search Report on application PCT/JP2011/070222 mailed Oct. 11, 2011; 2 pages.

*Primary Examiner* — Lisa Caputo
*Assistant Examiner* — Nigel Plumb
(74) *Attorney, Agent, or Firm* — Foley & Lardner LLP

(57) ABSTRACT

Measuring flow rate of gas based on amount of heat transfer from gas to temperature-sensing resistors, comprises: substrate having hollow space formed therethrough; an insulating film deposited on the substrate so as to cover the hollow space; a heat-generating resistor formed on the insulating film; temperature-sensing resistors arranged adjacent to the heat-generating resistor; electrodes arranged at an edge of the semiconductor substrate so electrodes are parallel to the edge; and wiring connecting the electrodes and heat-generating resistors. Thermal resistance of a first area is made almost equal to thermal resistance of a second area, first area is defined by the side of the heat-generating resistor closer to the electrodes and by the side of the hollow space closer to the electrodes, and the second area is defined by the opposite side of the heat-generating resistor and by the opposite side of the hollow space.

15 Claims, 17 Drawing Sheets

(51) Int. Cl.
*G01F 1/684* (2006.01)
*G01F 1/692* (2006.01)

(56) References Cited

U.S. PATENT DOCUMENTS 6,557,411 B1 * 5/2003 Yamada et al. ............ 73/204.26
2005/0120789 A1 * 6/2005 Matsumoto et al. ....... 73/204.15

FOREIGN PATENT DOCUMENTS

| | | | |
|---|---|---|---|
| JP | 2005-172463 | A | 6/2005 |
| JP | 2007-101561 | A | 4/2007 |
| JP | 2009-198299 | A | 9/2009 |

* cited by examiner

THERMAL FLOWMETER

TECHNICAL FIELD

The present invention relates to thermal flowmeters for measuring the flow rate of gas using a heat-generating resistor. The invention relates particularly to a thermal flowmeter suitable for measuring the air intake rate of the internal combustion engine of an automobile or the flow rate of exhaust gas discharged from an automobile.

BACKGROUND ART

Thermal flowmeters capable of measuring mass flow directly are now widely used as air flow meters for detecting the air intake amount of the internal combustion engine of an automobile or the like.

In recent years, thermal flowmeters have been proposed in which a sensor element is formed on a semiconductor substrate (e.g., a silicon substrate) by micromachining. Such semiconductor sensor elements are fabricated by forming a rectangular hollow space through a semiconductor substrate, depositing an insulating film of several micrometers to cover the hollow space, and placing a heat-generating resistor on the insulating film. Typically, temperature-sensing resistors are arranged adjacent to the heat-generating resistor, whereby the flow rate of gas flowing over the heat-generating resistor is measured based on the amount of heat transfer from the gas to the temperature-sensing resistors. The size of the heat-generating resistor is quite small (e.g., several hundreds of micrometers wide) and shaped into a film of several micrometers; thus, it is small in thermal capacity, highly responsive, and requires less power consumption.

On the other hand, various improvements are being made to increase the reliability of such sensors (e.g., by preventing damage to the sensors resulting from oil and dust particles present in the air passageways in which the sensors are installed). In one such improvement, to reduce contamination of a sensor element, the sensor element is installed within an air passageway that allows the passage of part of an air flow. This air passageway is bent into an irregular shape so that the effects of inertia can prevent oil or dust particles from colliding with the sensor element.

However, when a sensor element is installed in such an irregular air passageway, the inertia exerted on an air flow in the passageway changes according to the rate of the air flow. This in turn changes the direction of the air flow over the sensor element according to the rate of the air flow, resulting in an error in the flow rate detected by the senor element.

One of the reasons for such a detection error is that the temperature distribution near the heat-generating resistor becomes uneven due to the irregularity of the structures near the heat-generating resistor. Thus, even a small change in air flow direction will change the detection sensitivity of the sensor element. If the heat-generating resistor is further reduced in size, the temperature distribution near the heat-generating resistor becomes more uneven, resulting in larger measurement errors. To solve the above issue, the air flow meter of Patent Document 1 below is designed to adjust the amount of heat generated by a heat-generating resistor by locally increasing or decreasing the line width of the resistor so that a uniform temperature distribution can be achieved.

PRIOR ART DOCUMENT

Patent Document

Patent Document 1: JP-2009-198299-A

SUMMARY OF THE INVENTION

Problems to be Solved by the Invention

Typically, the line width of a heat-generating resistor is smaller at some locations of the resistor than at other locations. When such a heat-generating resistor is formed on a small sensor element, thinner portions of the resistor are low in strength. Thus, the sensor element may be damaged by oil and dust particles or by electromigration. In Patent Document 1, sufficient consideration has been given to the temperature distribution near a heat-generating resistor, but little attention has been paid to the structural strength of the heat-generating resistor.

The present invention has been contrived to solve the above issues. One object of the invention is to provide a highly accurate, small-sized, low power consumption thermal flowmeter that, when installed in the engine of an automobile or the like, reduces changes in the detection sensitivity of its sensor element due to subtle directional changes of air flow without reducing the strength of a heat-generating resistor, thereby reducing flow rate measurement errors.

Means for Solving the Problems

To achieve the above object, the present invention provides a thermal flowmeter in which the thermal resistance of a first area is made almost equal to the thermal resistance of a second area, the first area being defined by the side of a heat-generating resistor closer to electrodes and the side of a diaphragm closer to the electrodes, the second area being defined by the opposite side of the heat-generating resistor and the opposite side of the diaphragm.

This application incorporates the content of Japanese Patent Application No. 2010-220248 from which we claim priority and its drawings.

Effects of the Invention

In accordance with the present invention, it is possible to provide a highly accurate, small-sized, low power consumption thermal flowmeter that reduces errors in flow rate measurement by reducing changes in the detection sensitivity of its sensor element due to subtle directional changes of air flow.

MODE FOR CARRYING OUT THE INVENTION

Embodiments of the present invention will now be described with reference to FIGS. 1 through 26.

Embodiment 1

Embodiment 1 of the invention is described below.

Figure 1:
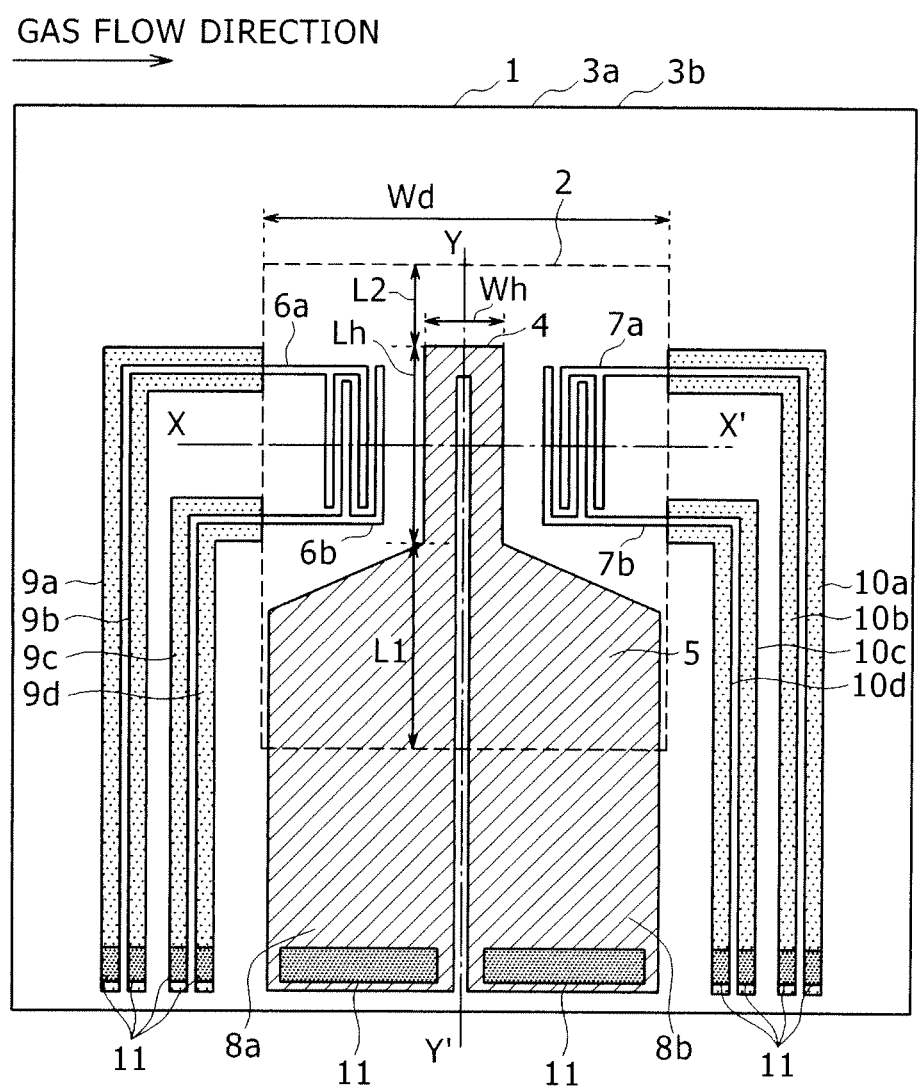
FIG. 1 is a plan view of a sensor element according to Embodiment 1.
Figure 2:
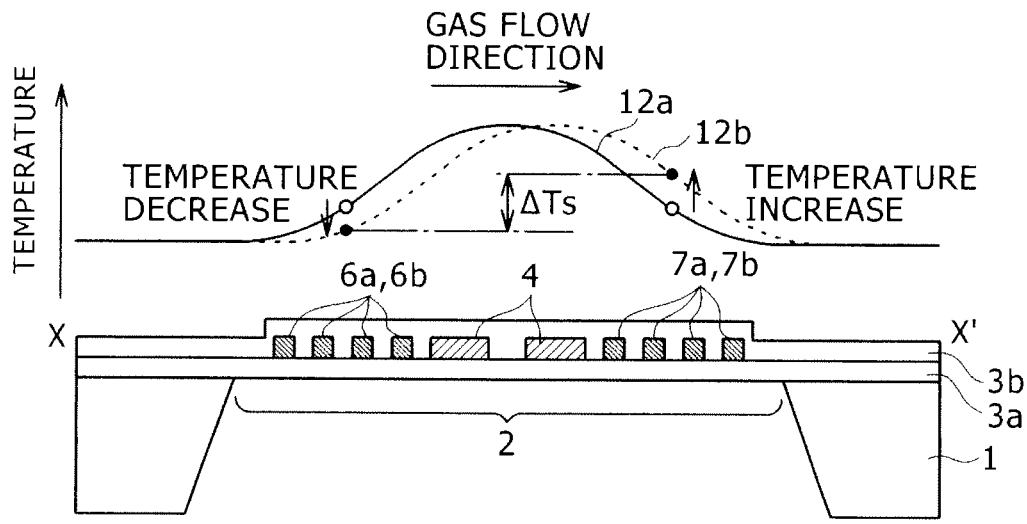
FIG. 2 is a cross section taken along line X-X' of FIG. 1, also illustrating the temperature distribution of the sensor element across line X-X'.

FIGS. 1 and 2 illustrate the structure of the sensor element used in a thermal flowmeter according to Embodiment 1.

Referring to FIG. 1, a semiconductor substrate 1, one of the components constituting the sensor element, is formed of a heat conductive material such as silicon (Si) and a ceramic material. An insulating film 3a is formed on the top surface of the substrate 1, and the bottom surface of the substrate 1 is partially etched away to form a diaphragm 2 (i.e., a hollow space). Further, a heat-generating resistor 4 and wiring 5 for supplying electricity to the resistor 4 are formed on the surface of the insulating film 3a below which the diaphragm 2 is located.

The arrangement of the heat-generating resistor 4 in the Y-Y' direction is such that L1>L2, where L1 is the distance from the short side of the diaphragm 2 above which the wiring 5 is located to the wiring-side end of the resistor 4, and L2 is the distance from the other short side of the diaphragm 2 above which the wiring 5 is not located to the distal end of the resistor 4. The position of the resistor 4 in the X-X' direction is such that the resistor is located at the center of the diaphragm 2.

Further, upstream temperature-sensing resistors 6a and 6b and downstream temperature-sensing resistors 7a and 7b are provided such that the heat-generating resistor 4 is interposed between these resistors. The upstream resistors 6a and 6b are located upstream of the heat-generating resistor 4 in terms of gas flow while the downstream resistors 7a and 7b are located downstream of the heat-generating resistor 4. The outermost surface of the sensor element is covered with an insulating film 3b, which not only insulates electricity but also serves as a protective film. The components located on the top surface of the substrate 1 below which the diaphragm 2 is not located include the following: lead-out wires 8, 9, and 10 for connecting the heat-generating resistor 4, the upstream temperature-sensing resistors 6a and 6b, and the downstream temperature-sensing resistors 7a and 7b to drive and detector circuits; electrode pads 11; and the like. The electrode pads 11 can be formed of aluminum (Al) or the like.

The heat-generating resistor 4, the upstream temperature-sensing resistors 6a and 6b, and the downstream temperature-sensing resistors 7a and 7b are formed of a material with a relatively high resistance-temperature coefficient, so that the resistances of these resistors can change relatively greatly according to their temperatures. Examples include semiconductor materials such as impurity-doped polycrystalline or monocrystalline silicon and metal materials such as platinum (Pt), molybdenum (Mo), tungsten (W), and nickel alloy. The insulating films 3a and 3b are formed by shaping silicon dioxide ($SiO_2$) or silicon nitride ($Si_3N_4$) into a film of an about 2-μm total thickness, which is sufficient in terms of electric insulation.

The heat generated from the diaphragm 2 is mostly from the heat-generating resistor 4. Note that the heat-generating resistor 4 does not encompass those sections that, even if electrically connected to the resistor 4, have a low resistance per unit length (e.g., the wiring 5 which is made wider) and those sections that do not act as electric circuits (e.g., patterns projecting from the resistor 4). The resistance of the heat-generating resistor 4 per unit length is preferably ten or more times as large as the resistance of the wiring 5 per unit length.

Described next is how to fabricate the sensor element of Embodiment 1.

To form the substrate 1, a semiconductor such as monocrystalline silicon or the like is used. Silicon dioxide and silicon nitride are deposited on the top surface of the substrate 1 by thermal oxidation or chemical vapor deposition (CVD) to form the insulating film 3a of a particular thickness (e.g., 1 μm). Next, a polycrystalline silicon film (i.e., a semiconductor film) of an about 1-μm thickness is deposited by CVD or the like to form the resistors.

The polycrystalline silicon film is then subjected to heavy doping in which impurities are added to the film to adjust its resistance to a particular value. This is followed by photolithographic processes including resist application, light exposure, and reactive-ion etching to form the polycrystalline silicon film into a particular pattern. The photolithographic processes result in the formation of the heat-generating resistor 4, the wiring 5, the temperature-sensing resistors 6a, 6b, 7a, and 7b, and the lead-out wires 8a, 8b, 9a to 9d, and 10a to 10d.

In the next step, silicon dioxide and silicon nitride are deposited by CVD to form the protective insulating film 3b of an about 1-μm thickness, as is similar to the insulating film 3a.

Thereafter, the insulating film 3b is partially removed to form aluminum or metal electrodes as the electrode pads 11, which are connected to an external circuit. It is instead possible to form the lead-out wires 8a, 8b, 9a to 9d, and 10a to 10d, which are used to connect the resistors to the electrodes, into multi-layered structures each comprising a polycrystalline film and an aluminum or metal film.

In the final step, the diaphragm 2 (i.e., a hollow space) is formed on the bottom surface of the substrate 1. This is done by anisotropic etching which involves the use of an etching mask with a particular pattern and an etching solution such as potassium hydroxide (KOH) or the like.

The above steps result in the formation of the sensor element.

We will now describe the detection principles of the thermal flowmeter using FIG. 2.

The temperature distributions 12a and 12b of FIG. 2 are those obtained from line X-X' of the sensor element. The temperature distribution 12a is the one across the diaphragm 2 with no air flow while the temperature distribution 12b is the one across the diaphragm 2 with air flow. In the presence of air flow, the temperature upstream of the heat-generating resistor 4 is lowered. On the other hand, the temperature downstream of the resistor 4 is increased because the air heated by the resistor 4 flows downstream. Accordingly, the flow rate of the air can be measured by detecting the temperature difference ΔTS between the temperatures upstream and downstream of the resistor 4 using the upstream resistors 6a and 6b and the downstream resistors 7a and 7b.

Figure 3:
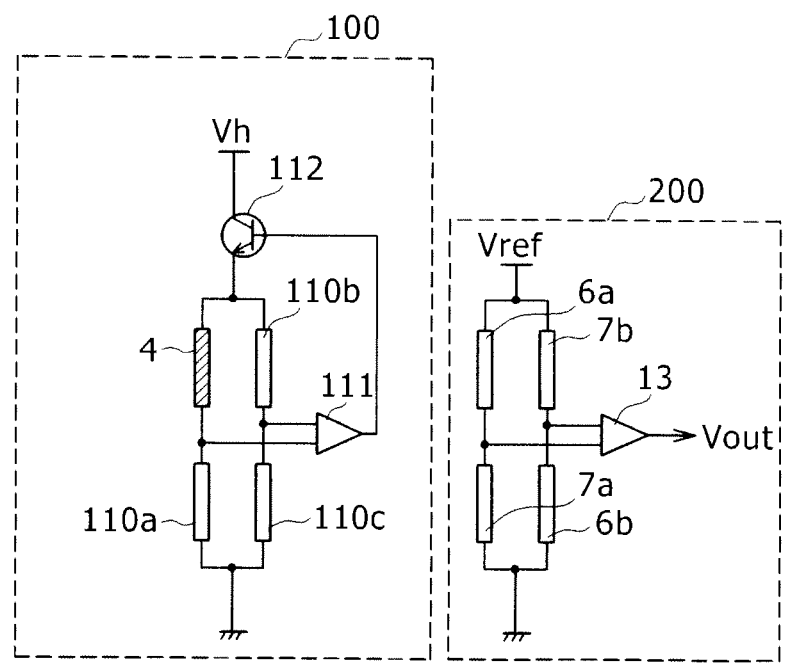
FIG. 3 illustrates the structure of a detector circuit used in a thermal flowmeter.

Next described with reference to FIG. 3 is the operation of a circuit for measuring the temperature difference ΔTS.

The circuit of FIG. 3 includes a drive circuit 100 for applying drive voltage Vh to cause the resistor 4 to generate heat and a bridge circuit 200 for measuring the difference ΔTS. The drive circuit 100 includes a bridge circuit comprising two series circuits connected in parallel. One of the series circuits includes the heat-generating resistor 4 and a fixed resistor 110a while the other includes fixed resistors 110b and 110c. The drive voltage Vh is applied to each of the series circuits, and the intermediate voltages of the series circuits are directed to an amplifier 111. The output of the amplifier 111 is connected to the base of a transistor 112. The collector and emitter of the transistor 112 are connected to the source of the voltage Vh and the heat-generating resistor 4, respectively, thereby forming a feedback circuit. With the above circuit configuration, the temperature Th of the heat-generating resistor 4 is controlled to be greater than the temperature Ta of air flow by a temperature ΔT (=Th−Ta). It should be noted that the fixed resistors 110a, 110b, and 110c are arranged at a location thermally isolated from the heat-generating resistor 4. Examples of such a location include a section of the substrate 1 below which the diaphragm 2 is not located and locations other than the substrate 1.

The bridge circuit 200 comprises two series circuits connected in parallel. One of the series circuits includes the temperature-sensing resistors 6a and 7a while the other includes the temperature-sensing resistors 6b and 7b. Reference voltage Vref is applied to these series circuits. When the temperature difference ΔTS arises between the upstream resistors 6a and 6b and the downstream resistors 7a and 7b due to air flow, the resistances of those resistors are caused to change according to their temperatures. This in turn changes the resistance balance of the bridge circuit 200, creating a voltage difference between the two intermediate voltages of the series circuits. Based on this differential voltage, an amplifier 13 produces output Vout which changes according to the flow rate.

As already stated, the sensor element includes the upstream temperature-sensing resistors 6a and 6b located upstream of the heat-generating resistor 4 in terms of gas flow and the downstream temperature-sensing resistors 7a and 7b located downstream of the heat-generating resistor 4. These upstream resistors and downstream resistors are arranged symmetrically with respect to a longitudinal axis (see FIG. 1). Such arrangement allows detection of the flow rate of gas flowing in forward and reverse directions.

Next, the advantageous effects of Embodiment 1 are described with reference to FIGS. 4 through 12.

Figure 4:
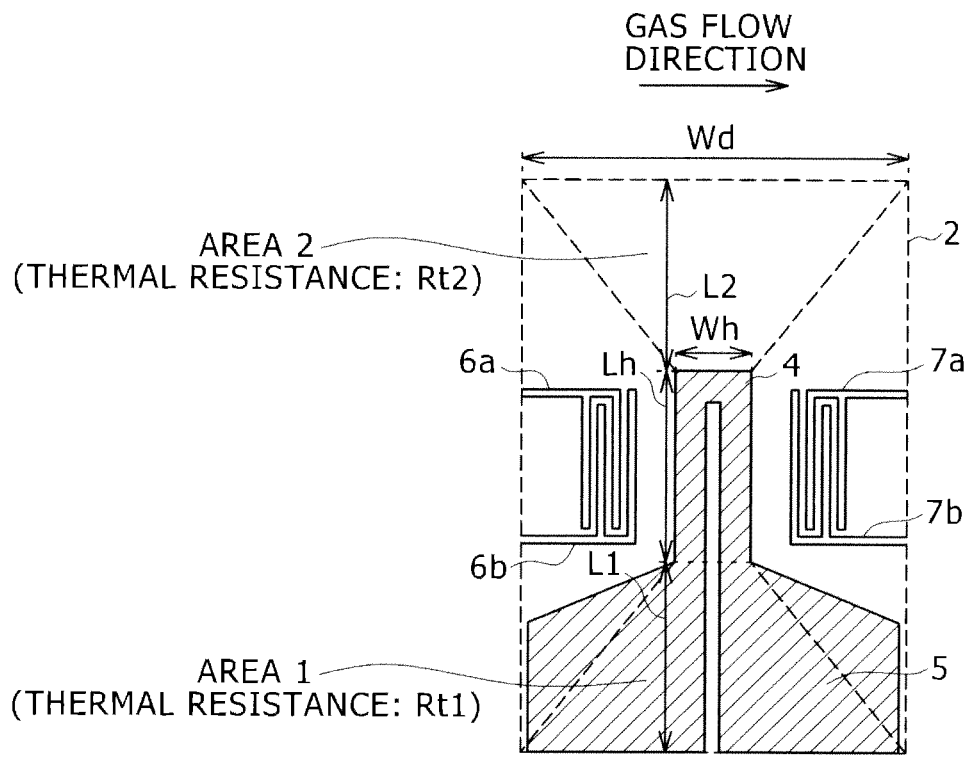
FIG. 4 illustrates areas 1 and 2.

FIG. 4 illustrates areas 1 and 2. The area 1 is defined as the trapezoidal area having length L1, width Wd, and width Wh, where length L1 is the distance from the short side of the diaphragm 2 above which the wiring 5 is located to the wiring-side end of the resistor 4, width Wd is the X-X' directional width of the diaphragm 2, and width Wh is the X-X' directional width of the heat-generating resistor 4. The area 2 is defined as the trapezoidal area having length L2, width Wd, and width Wh. That being stated, the thermal resistance Rt1 of the area 1 in the Y-Y' direction and the terminal resistance Rt2 of the area 2 in the Y-Y' direction can be presented by the following Equations 1 and 2, respectively.

$$Rt1 = L1 \times \log(Wh/Wd)/((k1t1+k2t2+\eta 1 k3t3)(Wh-Wd)) \quad \text{[Equation 1]}$$

$$Rt2 = L2 \times \log(Wh/Wd)/((k1t1+k2t2+\eta 2 k3t3)(Wh-Wd)) \quad \text{[Equation 2]}$$

The following should be noted. k1 and t1 are the heat transfer coefficient and the thickness, respectively, of one of the materials constituting the insulating films 3a and 3b (e.g., silicon dioxide). k2 and t2 are the heat transfer coefficient and the thickness, respectively, of another material constituting the insulating films 3a and 3b (e.g., silicon nitride). k3 and t3 are the heat transfer coefficient and the thickness, respectively, of the material constituting the heat-generating resistor 4, the temperature-sensing resistors 6a, 6b, 7a, and 7b, and the wiring 5 (e.g., impurity-doped polycrystalline silicon). η1 is the ratio of the total area of the heat-generating resistor 4, the temperature-sensing resistors 6a, 6b, 7a, and 7b, and the wiring 5 to the area 1 while η2 is the ratio of the total area of the heat-generating resistor 4, the temperature-sensing resistors 6a, 6b, 7a, and 7b, and the wiring 5 to the area 2.

Figure 6:
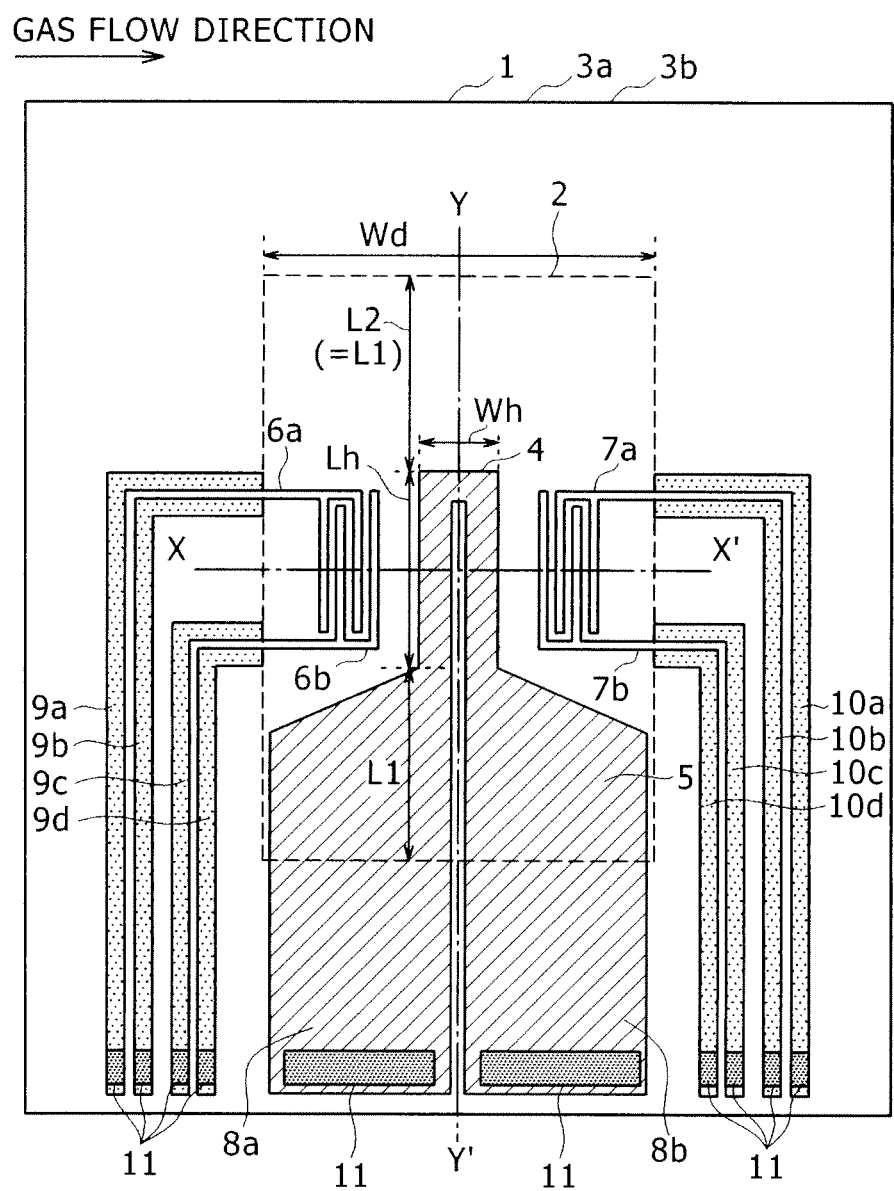
FIG. 6 illustrates a sensor element to which the invention is not applied.
Figure 7:
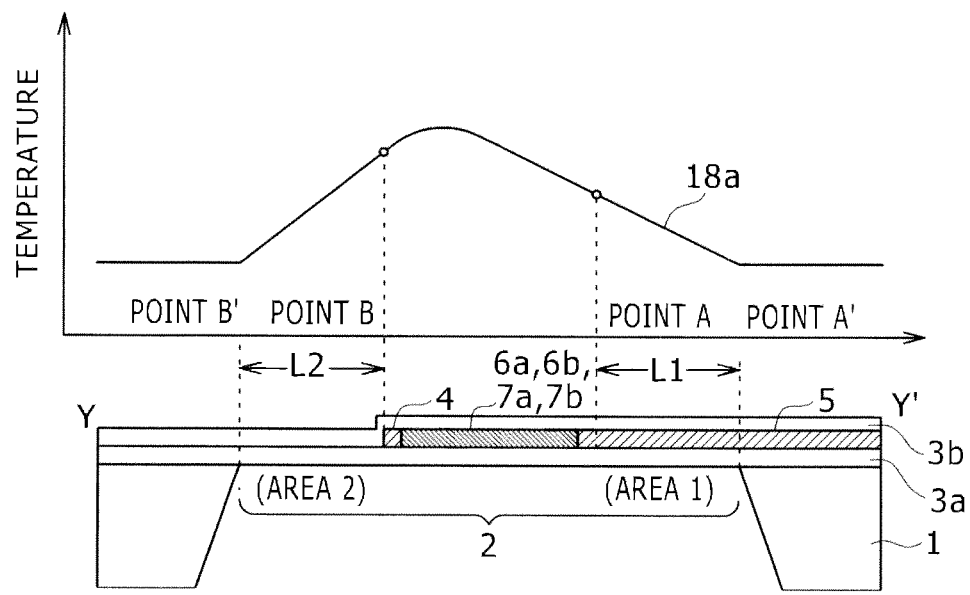
FIG. 7 is a cross section taken along line Y-Y' of FIG. 6, also illustrating the temperature distribution of the sensor element of FIG. 6 across line Y-Y'.
Figure 8:
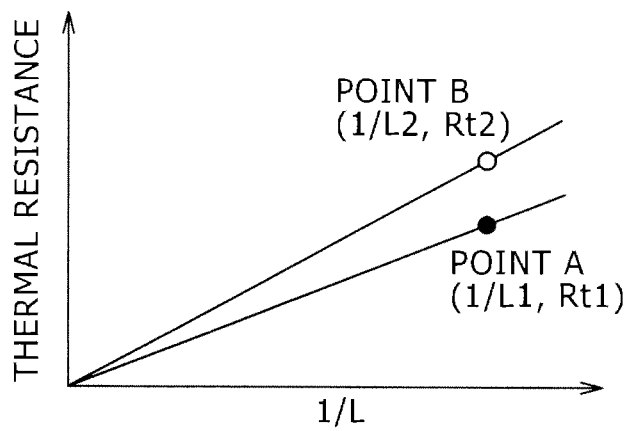
FIG. 8 is a graph illustrating the thermal resistances of the areas 1 and 2 of the sensor element of FIG. 6.
Figure 9:
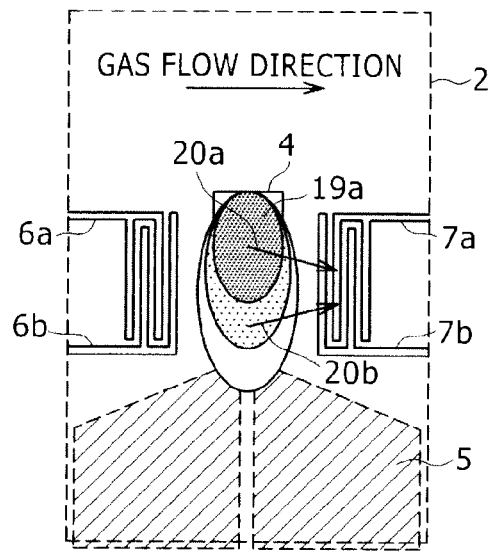
FIG. 9 is a plan view illustrating the temperature distribution near the heat-generating resistor of the sensor element of FIG. 6.

Referring next to FIG. 6, another sensor element is shown in which the Y-Y' directional arrangement of its heat-generating resistor 4 is such that L1=L2. FIG. 7 is a cross section taken along line Y-Y' of this sensor element. The components that lie within the area 1 are the insulating films 3a and 3b and the wiring 5, and the components that lie within the area 2 are the insulating films 3a and 3b. The heat-generating resistor 4, the upstream temperature-sensing resistors 6a and 6b, the downstream temperature-sensing resistors 7a and 7b, and the wiring 5 are formed of a semiconductor material such as impurity-doped polycrystalline or monocrystalline silicon or a metal material such as platinum, molybdenum, tungsten, and nickel alloy. The insulating films 3a and 3b are formed of silicon dioxide and silicon nitride. Generally, silicon dioxide and silicon nitride are higher in thermal resistance than semiconductor materials such as impurity-doped polycrystalline or monocrystalline silicon and metal materials such as platinum, molybdenum, tungsten, and nickel alloy. Thus, as illustrated in FIG. 8, the relationship between length L1 and the thermal resistance Rt1 of the area 1 and the relationship between length L2 and the thermal resistance Rt2 of the area 2 are such that the increase rate of the thermal resistance Rt1 in response to increases in 1/L is smaller than that of the thermal resistance Rt2. Accordingly, when L1=L2, the temperature of the sensor element at point B is higher than the temperature at point A, resulting in the Y-Y' directional temperature distribution 18a of FIG. 7. The plan view of FIG. 9 illustrates the isothermal lines 19a that represent the temperature distribution 18a as viewed from above.

Figure 5:
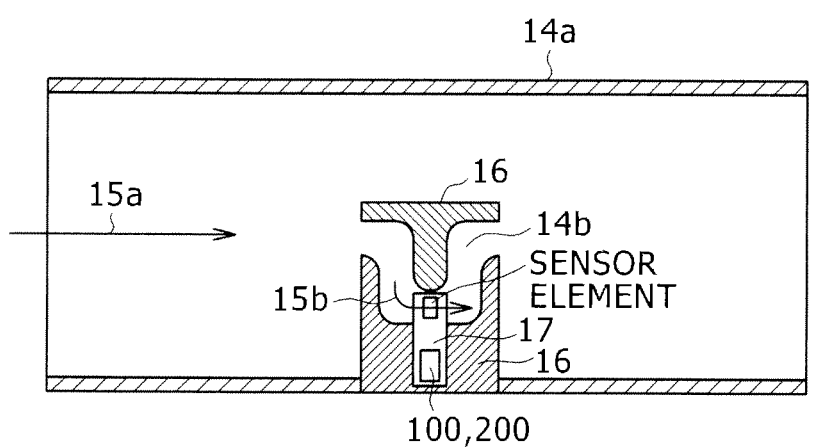
FIG. 5 is an installation example of the sensor element of Embodiment 1.

FIG. 5 is an installation example of the sensor element of Embodiment 1. As illustrated in the figure, a base section 16 is provided within a pipe 14a through which air 15a flows. The base section 16 protrudes from the inner surface of the pipe 14a, and an air passageway 14b penetrates the base section 16. Accordingly, part of the air 15a flowing through the pipe 14a is directed into the air passageway 14b. Also, a circuit board 17 having the drive circuit 100 and the detector circuit 200 is installed within the base section 16 such that part of the circuit board 17 protrudes into the air passageway 14b. The sensor element is attached to this protruding section of the circuit board 17, thereby performing flow rate measurement using the air 15b flowing through the air passageway 14b.

The air passageway 14b is substantially U-shaped for the purpose of reducing contamination of the sensor element. For this reason, the inertia force exerted on the air 15b within the air passageway 14b changes according to the flow rate, and the direction of the air 15b over the sensor element also changes according to the flow rate.

Note however that the air passageway 14b is not limited to the U-shape, but can have any other shape as long as inertia force is exerted on the air 15b flowing through the air passageway 14b. For the purpose of reducing contamination of the sensor element, it is also possible to shape the air passageway 14b such that centrifugal force is exerted on the air 15b flowing through the air passageway 14b. In that case as well, the centrifugal force changes according to the flow rate, and so does the direction of the air 15b over the sensor element.

If a sensor element in which L1=L2 is used, the detection sensitivity of the sensor element decreases due to such directional changes of the air 15b. Referring to FIG. 9, when airflows 20a and 20b tilted by inertia move over the diaphragm 2, they are heated by the heat-generating resistor 4 before reaching the downstream temperature-sensing resistors 7a and 7b. When the air flows 20a and 20b move over the heat-generating resistor 4, they pass over different locations of different temperatures. Accordingly, the temperatures of the air flows 20a and 20b moving toward the downstream resistors 7a and 7b are different, with the temperature of the air flow 20a being higher than that of the air flow 20b. After reaching the downstream resistors 7a and 7b, the airflow 20a transfers more heat to the resistors 7a and 7b than the air flow 20b. This greatly changes the resistances of the downstream resistors 7a and 7b, resulting in favorable detection sensitivity. However, the air flow 20b transfers less heat to the downstream resistors 7a and 7b, resulting in reduced detection sensitivity due to smaller changes in the resistances of the downstream resistors 7a and 7b.

Thus, in the case of a sensor element in which L1=L2, the detection sensitivity is subject to change due to changes in air flow direction, which in turn reduces measurement accuracy.

Figure 10:
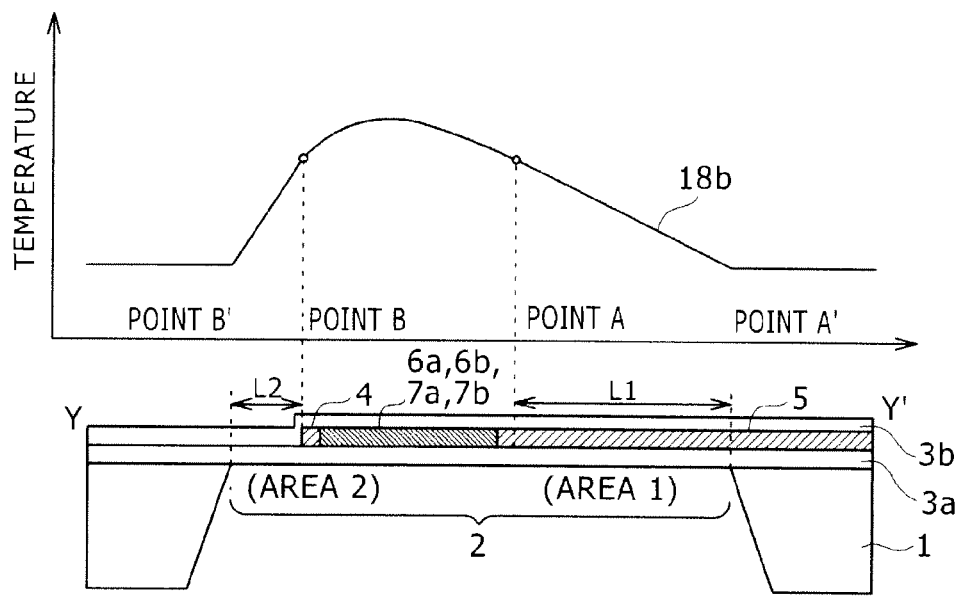
FIG. 10 is a cross section taken along line Y-Y' of FIG. 1, also illustrating the temperature distribution of the sensor element of Embodiment 1 across line Y-Y'.
Figure 11:
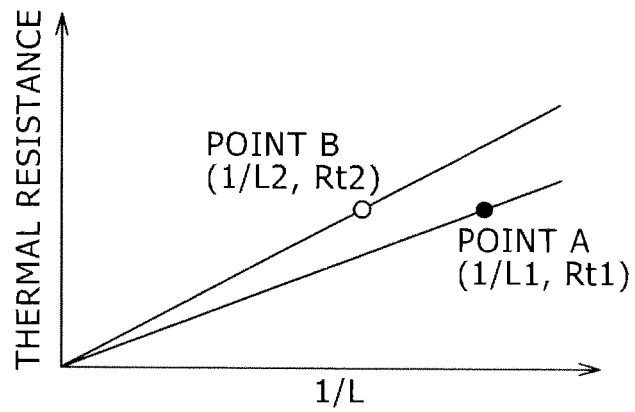
FIG. 11 is a graph illustrating the thermal resistances of the areas 1 and 2 of the sensor element of Embodiment 1.

In contrast, the heat-generating resistor 4 of Embodiment 1 is arranged such that L1>L2 as illustrated in FIG. 1. FIG. 10 is a cross section taken along line Y-Y' of FIG. 1, also illustrating the temperature distribution of the diaphragm 2 across line Y-Y'. By making L1 greater than L2 using Equations 1 and 2, Rt1 can made larger and Rt2 smaller. As a result, when L1>L2, Rt1 at point A can be made almost equal to Rt2 at point B as illustrated in FIG. 11. The temperature distribution 18b of the FIG. 10 represents the Y-Y' directional temperature distribution across the sensor element when L1>L2.

Figure 12:
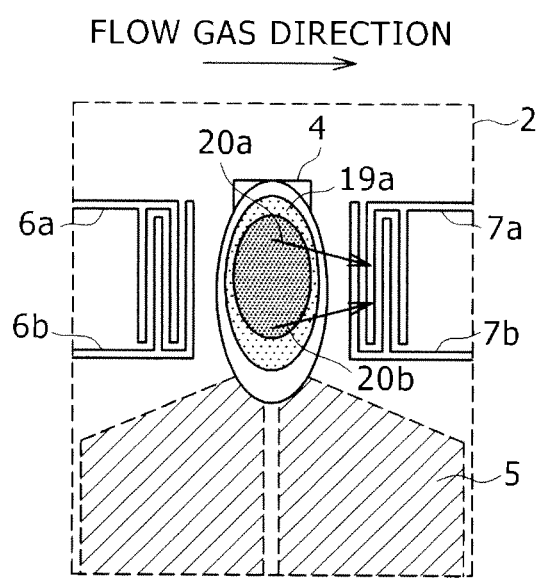
FIG. 12 is a plan view illustrating the temperature distribution near the heat-generating resistor of the sensor element of Embodiment 1.

FIG. 12 illustrates the isothermal lines 19b that represent the temperature distribution 18b. Referring to FIG. 12, when air flows 20a and 20b tilted by inertia move over the diaphragm 2, they are heated by the heat-generating resistor 4 before reaching the downstream temperature-sensing resistors 7a and 7b. When the air flows 20a and 20b move over the heat-generating resistor 4, they pass over different locations of almost the same temperature. Accordingly, the temperatures of the air flows 20a and 20b moving toward the downstream resistors 7a and 7b are almost the same. As a result, the amount of heat transferred from an air flow to the downstream resistors 7a and 7b stays the same even if the direction of the air flow changes. Therefore, when L1>L2, favorable sensitivity can be maintained for flow rate detection, resulting in increased measurement accuracy.

The width of the wiring 5 is preferably larger than the width of the heat-generating resistor 4. By making the width of the wiring 5 larger, the resistance of the wiring 5 can be reduced, and an electric current flowing through the wiring 5 can be prevented from increasing the temperature of the wiring 5. As a result, the temperature distribution near the heat-generating resistor 4 can be made more uniform.

Figure 13:
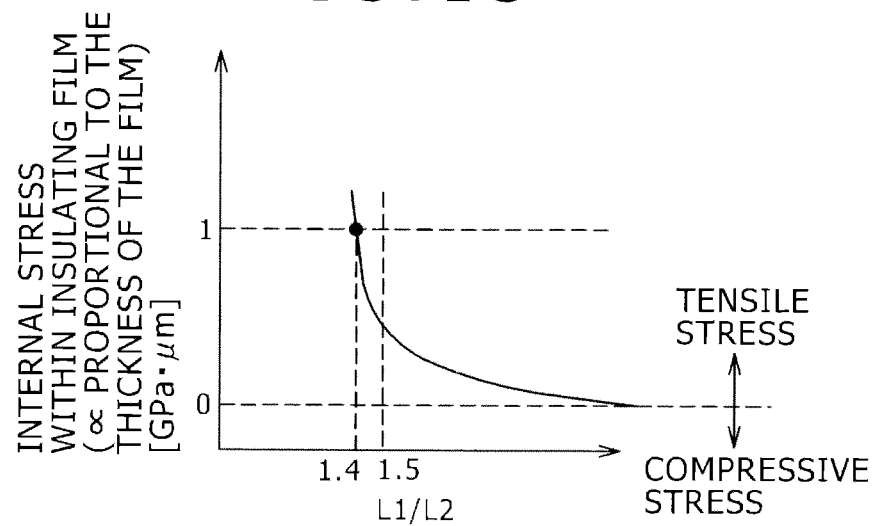
FIG. 13 is a graph illustrating the relationship between the arrangement index (L1/L2) of a heat-generating resistor and insulating films.
Figure 14:
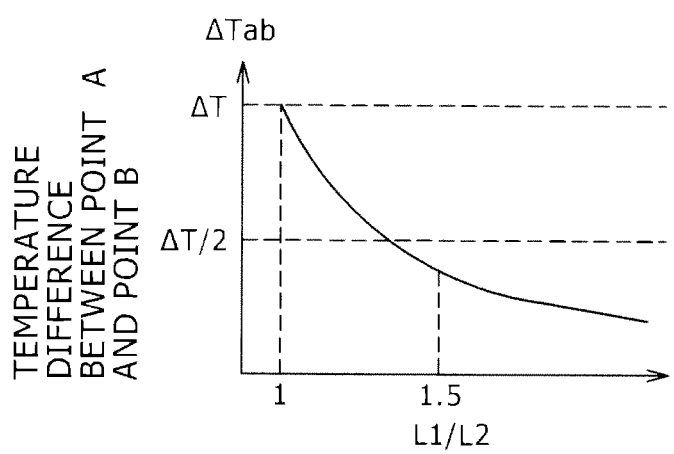
FIG. 14 is a graph illustrating the relationship between the arrangement index (L1/L2) of the heat-generating resistor and the temperature difference between point A and point B.

Referring now to FIGS. 13 and 14, a preferred method of determining L1 and L2 is described.

To make the thermal flowmeter effective, the ratio of L1 to L2 (i.e., L1/L2) is preferably 1.5 or greater. Note that the value of L1/L2 that meets the condition that Rt1=Rt2 can be calculated from Equation 3 below. For simplification purposes, t12 is set to zero.

$$L1/L2=(k1t1+k2t2+\eta 1k3t3)/(k1t1+k2t2) \quad \text{[Equation 3]}$$

According to Equation 3, the condition Rt1=Rt2 can be satisfied not only by changing the ratio of L1 to L2 but also by making both of t1 and t2 larger than t3. In the latter case, the thickness t1 of the silicon dioxide film constituting the insulating films 3a and 3b and the thickness t2 of the silicon nitride constituting the insulating films 3a and 3b are made sufficiently larger than the thickness t3 of the material constituting the heat-generating resistor 4, the temperature-sensing resistors 6a, 6b, 7a, and 7b, and the wiring 5. This reduces the ratio of the contribution of the heat-generating resistor 4, the temperature-sensing resistors 6a, 6b, 7a, and 7b, and the wiring 5 to the thermal resistances Rt1 and Rt2. Note however that the silicon nitride constituting the insulating films 3a and 3b has a large tensile stress (1 GPa). Thus, when the thickness t2 is made too large, the insulating films 3a and 3b may be damaged, causing cracks in the diaphragm 2. Accordingly, attention has to be paid to the internal stresses of the insulating films 3a and 3b when the thickness t2 is adjusted.

FIG. 13 illustrates the relationship between L1/L2 and the internal stresses of the insulating films 3a and 3b proportional to their thicknesses that satisfy the condition Rt1=Rt2. As illustrated in FIG. 13, when L1/L2<1.5, the internal stresses are considerably high. When L1/L2=1.4, for instance, the internal stresses of the insulating films 3a and 3b are each 1 MPa·μm or thereabout, a level at which the insulating films 3a and 3b may be damaged. When L1/L2≥1.5, on the other hand, the internal stresses are stably low.

Also, when L1/L2<1.5, the thicknesses of the insulating films 3a and 3b are required to be considerably high to satisfy the condition Rt1=Rt2. On the other hand, increasing detection sensitivity requires increasing the thermal insulativity of the insulating films 3a and 3b. Satisfying the condition that L1/L2≥1.5 is effective not only in increasing the thermal insulativity of the insulating films 3a and 3b, but also in reducing the size of the sensor element.

FIG. 14 is a graph illustrating the relationship between L1/L2 and temperature difference ΔTab when the thicknesses of the insulating films 3a and 3b are kept constant. The temperature difference ΔTab is the difference between the temperature at point A and the temperature at point B. As illustrated in FIG. 14, the correlation curve between L1/L2 and ΔTab takes the form of a downward curve. The graph further reveals that the difference ΔTab when L1/L2≥1.5 is less than half the difference ΔTab when L1=L2 (i.e., L1/L2=1).

Thus, when L1/L2≥1.5, the thermal resistances of the areas 1 and 2 in a longitudinal direction can be made more uniform, thus resulting in a more uniform temperature distribution. Moreover, the insulating films 3a and 3b can be made thinner, and the sensor element can be reduced in size and increased in sensitivity.

Embodiment 2

Embodiment 2 of the invention is now described with reference to FIGS. 15 and 16.

Figure 15:
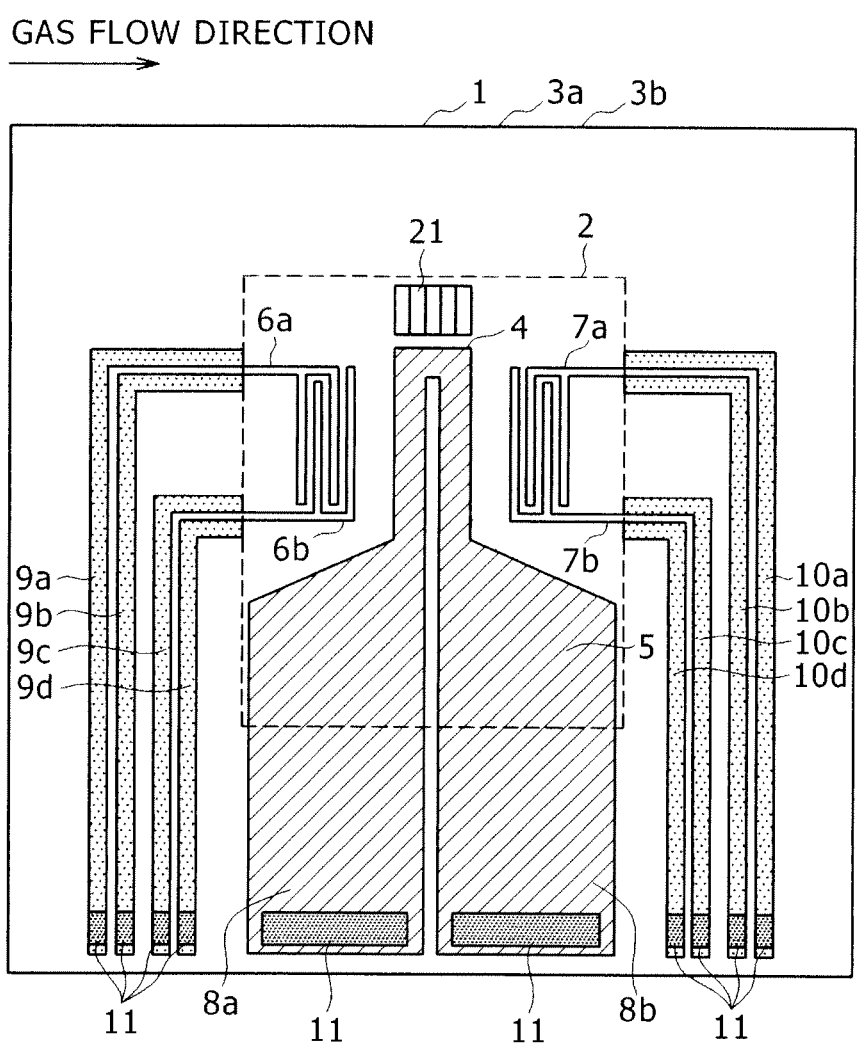
FIG. 15 is a plan view of a sensor element according to Embodiment 2.

FIG. 15 illustrates the structure of the sensor element used in a thermal flowmeter according to Embodiment 2.

The sensor element of Embodiment 2 is structurally the same as the sensor element of Embodiment 1 except that the former sensor element includes a thermal resistance adjuster 21. The thermal resistance adjuster 21 is located within the area 2 (i.e., located adjacent to the heat-generating resistor 4) and has a symmetrical shape with respect to the Y-Y' axis. The thermal resistance adjuster 21 can be formed of the same material as the material of the heat-generating resistor 4 and the like. To form the thermal resistance adjuster 21, an additional resist pattern may be used during the formation of the heat-generating resistor 4, the temperature-sensing resistors 6a, 6b, 7a, and 7b, and the wiring 5.

Figure 16:
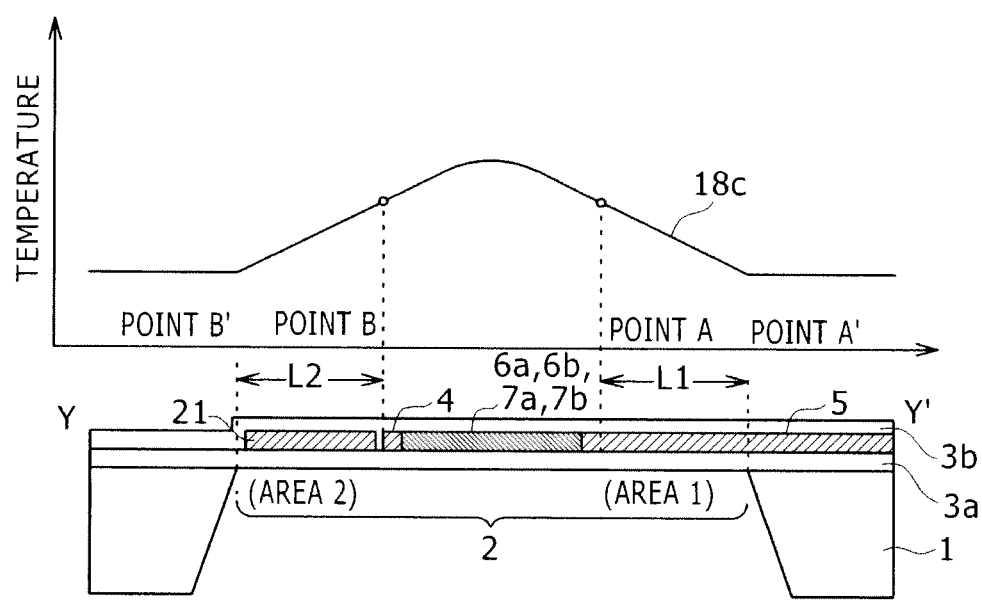
FIG. 16 is a cross section taken along line Y-Y' of FIG. 15, also illustrating the temperature distribution across the sensor element of Embodiment 2.

As illustrated in FIG. 16, by forming the thermal resistance adjuster 21 using the same material as that of the resistors, the layered structure of the area 2 (e.g., silicon dioxide and silicon nitride) can be made similar to the layered structure of the area 1 (e.g., silicon dioxide, silicon nitride, and polycrystalline silicon). Accordingly, the thermal resistances Rt1 and Rt2 are made closer to each other. This in turn rectifies the unevenness of the thermal resistances of the areas 1 and 2 in a longitudinal direction, resulting in a more uniform temperature distribution 18c.

Typically, a small sensor element has surface irregularities on its end because electrodes and bonding wires are connected to the end of the sensor element for connection to external circuits. When air flows over such surface irregularities on the sensor element, the air is disturbed, influencing the temperature distribution near its heat-generating resistor. Accordingly, the dimensions of such a sensor element and the value of L1/L2 are limited. Thus, in Embodiment 2, by positioning the thermal resistance adjuster 21 within the area 2, a uniform temperature distribution can be achieved without changing the dimensions of the sensor element. This is particularly useful for a small-sized sensor element.

The thermal resistance adjuster 21 is shaped into a polygon as in FIG. 15, but can also be divided into multiple sections. To make the sensor element of Embodiment 2 more effective, the ratio η2 of the area of the thermal resistance adjuster 21 to the area 2 can be calculated using Equation 4 below, thereby applying the obtained value to the structure of the sensor element. This makes the values of Rt1 and Rt2 almost the same.

$$\eta 2 = (L2/L1)(k_1 t_1 + k_2 t_2 + \eta 1 k_3 t_3)/(k_3 t_3)$$ [Equation 4]

Embodiment 3

Embodiment 3 of the invention is now described.

Figure 17:
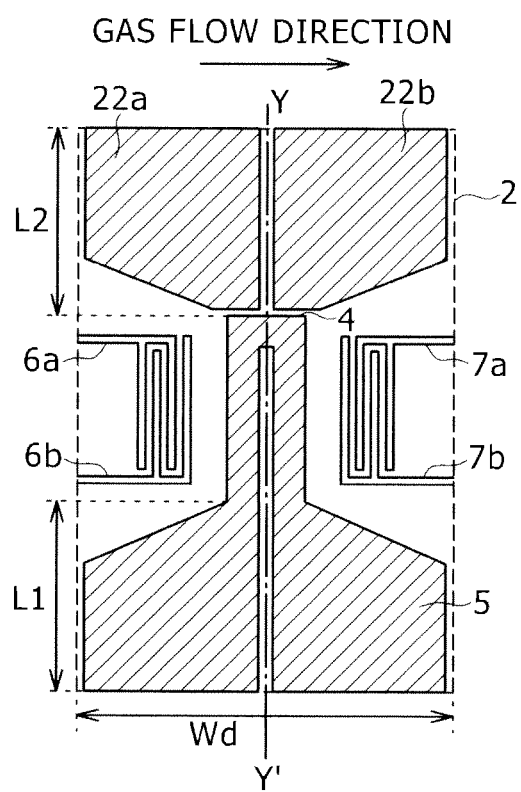
FIG. 17 is a plan view of a sensor element according to Embodiment 3.
Figure 18:
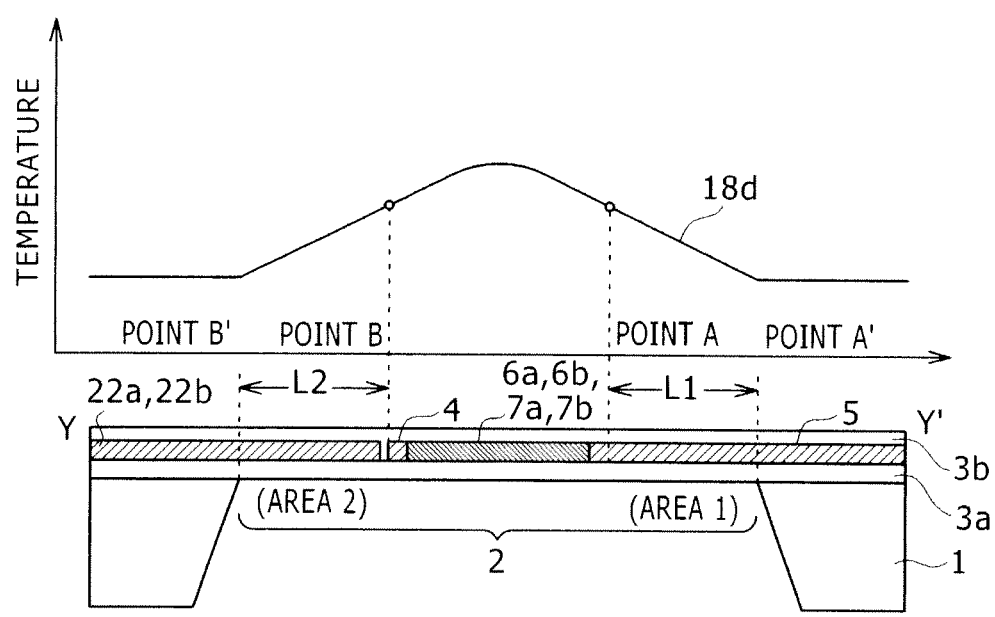
FIG. 18 is a cross section taken along line Y-Y' of FIG. 17, also illustrating the temperature distribution across the sensor element of Embodiment 3.
Figure 19:
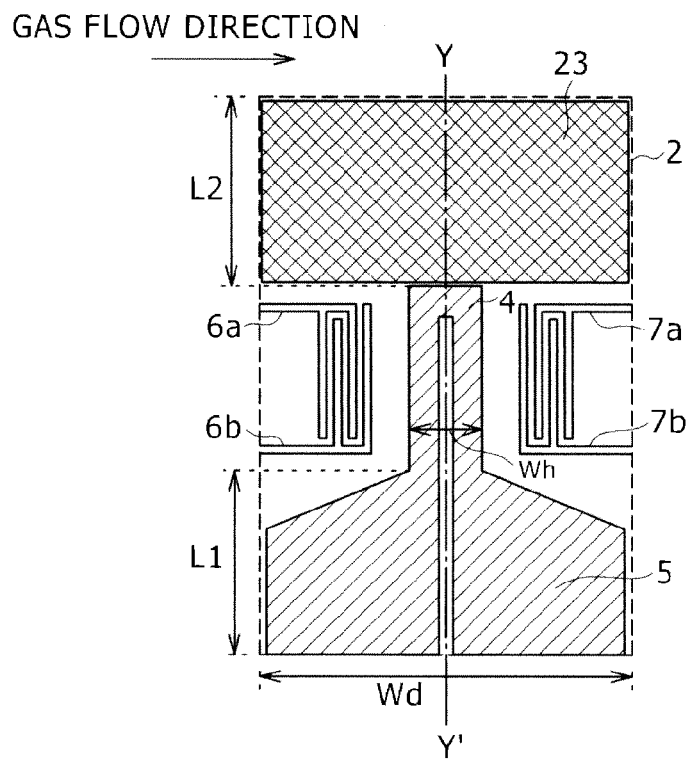
FIG. 19 is a plan view of a sensor element according to Embodiment 4.
Figure 20:
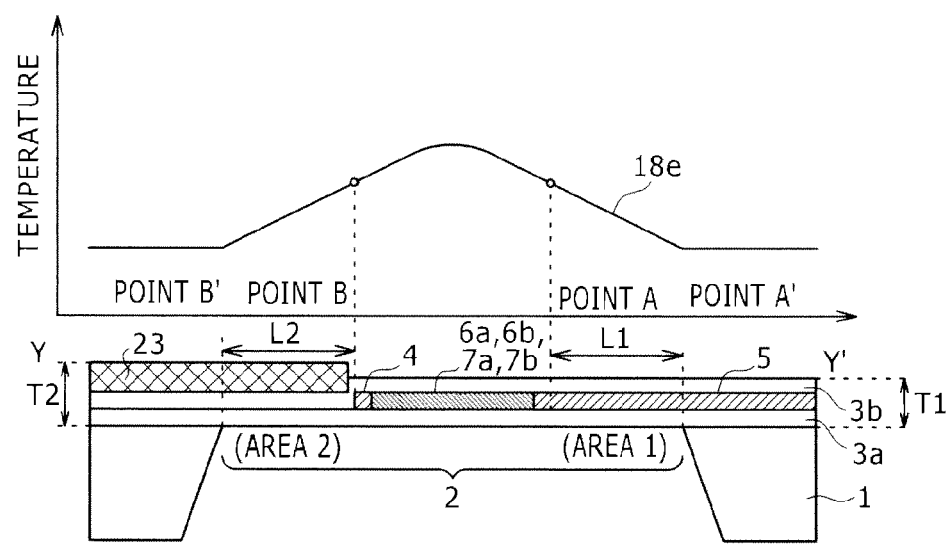
FIG. 20 is a cross section taken along line Y-Y' of FIG. 19, also illustrating the temperature distribution across the sensor element of Embodiment 4.

FIGS. 17 and 18 illustrate the structure of the sensor element used in a thermal flowmeter according to Embodiment 3.

The sensor element of Embodiment 3 is structurally the same as the sensor element of Embodiment 1 except that the former sensor element includes pseudo-wiring sections 22a and 22b. The pseudo-wiring sections 22a and 22b are located within the area 2 such that the arrangement of those sections and the wiring 5 is symmetrical. The pseudo-wiring sections 22a and 22b can be formed of the same material as the material of the heat-generating resistor 4 and the like. To form the pseudo-wiring sections 22a and 22b, an additional resist pattern may be used during the formation of the heat-generating resistor 4, the temperature-sensing resistors 6a, 6b, 7a, and 7b, and the wiring 5.

As illustrated in FIG. 18, the cross-sectional structures of the areas 1 and 2 of this sensor element are also symmetrical. This makes the values of Rt1 and Rt2 almost the same, as is obvious from Equations 1 and 2. Accordingly, the temperature distribution over the sensor element can be made uniform as illustrated by reference numeral 18d of FIG. 18. Thus, the sensor element of Embodiment 3 further rectifies the unevenness of the thermal resistances of the areas 1 and 2 in a longitudinal direction, resulting in a more uniform temperature distribution.

Embodiment 4

Embodiment 4 of the invention is now described.

FIGS. 17 and 18 illustrate the structure of the sensor element used in a thermal flowmeter according to Embodiment 4.

The sensor element of Embodiment 4 is structurally the same as the sensor element of Embodiment 1 except that the former sensor element includes a protective film 23. The protective film 23 is deposited on the insulating film 3b within the area 2. The protective film 23 can be formed of the same materials as those of the insulating films 3a and 3b. Further, as illustrated in FIG. 12, the sensor element of Embodiment 4 is formed such that the thickness T2 of the area 2 is larger than the thickness T1 of the area 1. The value of Rt2 of this sensor element can be represented by Equation 5 below.

$$Rt2 = L2 \times \log(Wh/Wd)/((k_1 t_1 + k_2 t_2 + \eta 2 k_3 t_3 + k_4 t_4)(Wh - Wd))$$ [Equation 5]

Note that k4 and t4 are the heat transfer coefficient and the thickness, respectively, of the protective film 23. The other letters are the same as in Embodiment 1. According to Equation 5, the presence of the protective film 23 makes the heat resistance Rt2 smaller and thus closer to the heat resistance Rt1. The value of t4 when Rt1 of Equation 1 is equal to Rt2 of Equation 5 is given by Equation 6 below.

$$t4 = (L2/L1)(k_1 t_1 + k_2 t_2 + \eta 1 k_3 t_3)/k_4 - (k_1 t_1 + k_2 t_2 + \eta 2 k_3 t_3)/k_4$$ [Equation 6]

When the thickness of the protective film 23 is made closer to the thickness t4 obtained from Equation 6, the values of Rt1 and Rt2 can be made almost the same. Accordingly, the temperature distribution over the sensor element can be made uniform as illustrated by reference numeral 18e of FIG. 20. Thus, the sensor element of Embodiment 4 rectifies the unevenness of the thermal resistances of the areas 1 and 2 in a longitudinal direction, resulting in a more uniform temperature distribution.

Embodiment 5

Embodiment 5 of the invention is now described.

Figure 21:
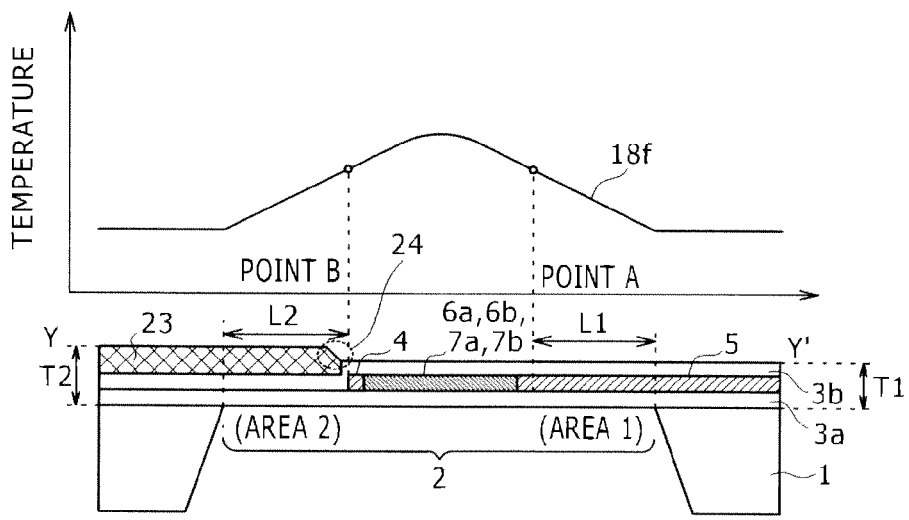
FIG. 21 is a cross section taken along line Y-Y' of a sensor element according to Embodiment 5, also illustrating the temperature distribution across the sensor element.

FIG. 21 illustrates the structure of the sensor element used in a thermal flowmeter according to Embodiment 5.

The sensor element of Embodiment 5 is structurally the same as the sensor element of Embodiment 4 except that the former sensor element includes a tilted surface at the thickness change point 24 where the thickness of the diaphragm 2 changes from T1 to T2. This structure allows the diffusion of stress applied to the boundary between the thickness T1 and the thickness T2.

When a thermal flowmeter is installed in the internal combustion engine of an automobile, not only does the heat-generating resistor increase the temperature over the diaphragm, but also the temperature around the sensor changes greatly. Thus, mechanical stresses such as thermal stress and vibration may damage the diaphragm. In contrast, the sensor element of Embodiment 5 allows the diffusion of stress applied to the boundary between the thickness T1 and the thickness T2. Therefore, the sensor element of Embodiment 5 increases the strength and durability of the diaphragm 2 and the strength of the insulating films 3a and 3b while at the same time rectifying the unevenness of the thermal resistances of the areas 1 and 2 in a longitudinal direction. As a result, a highly reliable flowmeter can be achieved.

Embodiment 6

Embodiment 6 of the invention is now described.

Figure 22:
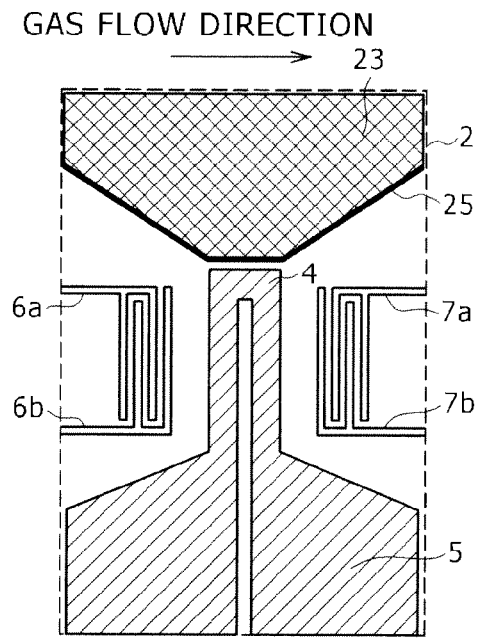
FIG. 22 is a plan view of a sensor element according to Embodiment 6.

FIG. 22 illustrates the structure of the sensor element used in a thermal flowmeter according to Embodiment 6.

The sensor element of Embodiment 6 is structurally the same as the sensor element of Embodiment 4 except that the protective film 23 of the former sensor element is formed such that the boundary 25 between the thickness T1 and the thickness T2 has at least one bent portion. This structure also allows the diffusion of mechanical stress applied to the boundary between the thickness T1 and the thickness T2. Therefore, the sensor element of Embodiment 6 also increases the strength and durability of the diaphragm 2 and the strength of the insulating films 3a and 3b while at the same time rectifying the unevenness of the thermal resistances of the areas 1 and 2 in a longitudinal direction. As a result, a highly reliable flowmeter can be achieved.

Embodiment 7

Embodiment 7 of the invention is now described with reference to FIGS. 23 to 25.

Figure 23:
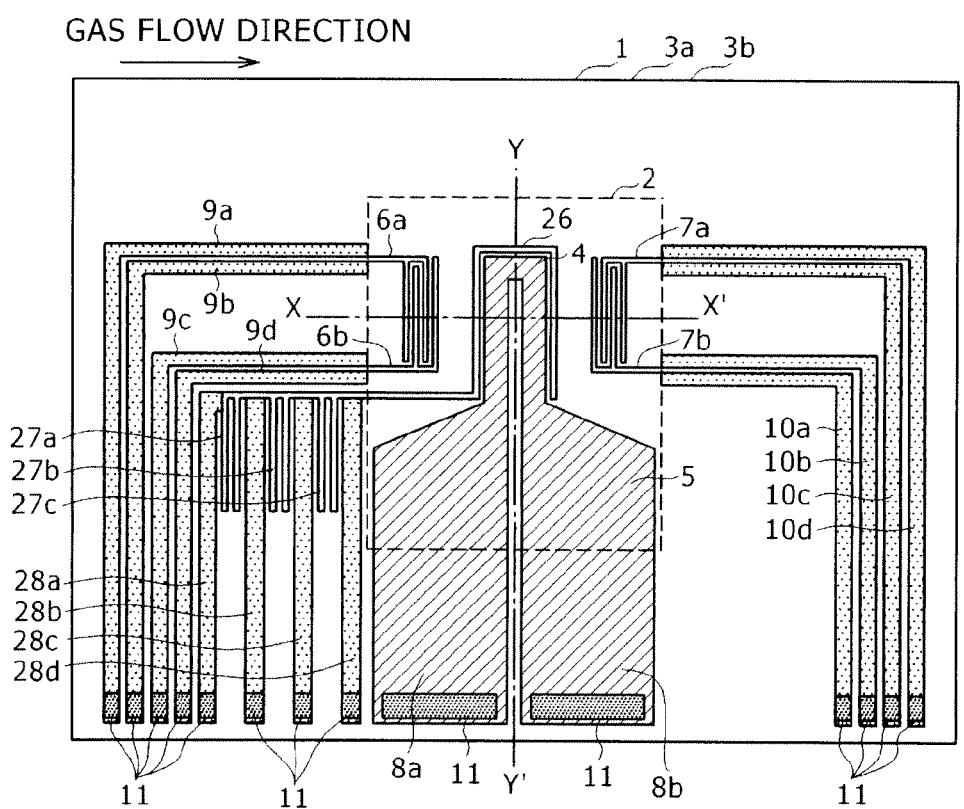
FIG. 23 is a plan view of a sensor element according to Embodiment 7.

FIG. 23 illustrates the structure of the sensor element used in a thermal flowmeter according to Embodiment 7.

The sensor element of Embodiment 7 is structurally the same as the sensor element of Embodiment 1 except that, in the former sensor element, a temperature-measuring resistor 26 is provided near the heat-generating resistor 4, and fixed resistors 27a, 27b, and 27c are arranged outside of the diaphragm 2. The temperature-measuring resistor 26 and the fixed resistors 27a, 27b, and 2c forms a bridge circuit, and the intermediate voltage of each of these resistors is directed through the lead-out wires 28a, 28b, 28c, and 28d to the electrode pads 11.

Figure 24:
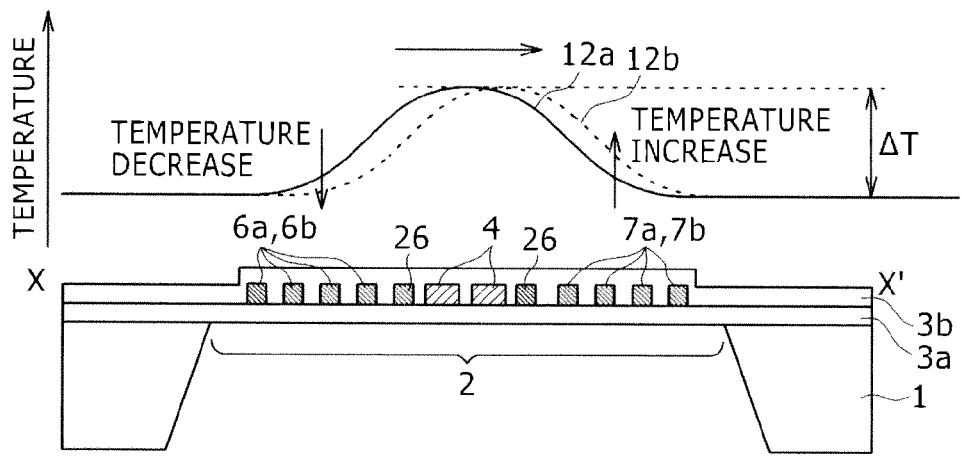
FIG. 24 is a cross section taken along line X-X' of FIG. 23, also illustrating the temperature distribution of the sensor element of Embodiment 7.

Described next with reference to FIG. 24 are the detection principles of the sensor element of Embodiment 7.

FIG. 24 is a cross section of the sensor element, also illustrating the temperature distributions 12a and 12b over the sensor element. The temperature distribution 12a is the one across the diaphragm 2 with no air flow while the temperature distribution 12b is the one across the diaphragm 2 with air flow. In the presence of air flow, the temperature upstream of the heat-generating resistor 4 is lowered. On the other hand, the temperature downstream of the resistor 4 is increased because the air heated by the resistor 4 flows downstream. Accordingly, the flow rate of the air can be measured by detecting the temperature difference $\Delta TS$ between the temperatures upstream and downstream of the resistor 4 using the upstream resistors 6a and 6b and the downstream resistors 7a and 7b.

Figure 25:
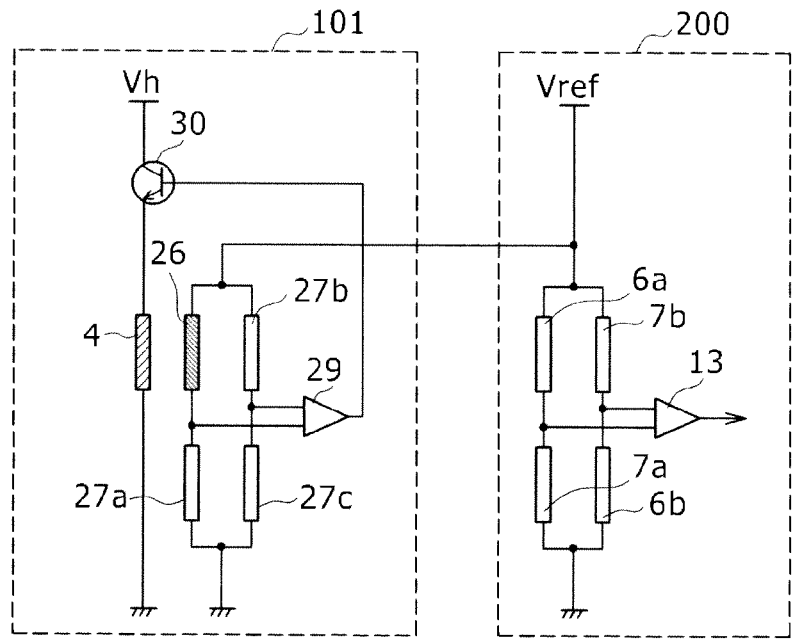
FIG. 25 illustrates the structure of a detector circuit according to Embodiment 7.

Next described with reference to FIG. 25 are the drive and detector circuits of Embodiment 7.

The drive circuit 101 of Embodiment 7 includes a bridge circuit comprising two series circuits connected in parallel. One of the series circuits includes the temperature-measuring resistor 26, which changes in resistance according to the temperature of the heat-generating resistor 4, and the fixed resistor 27a while the other includes the fixed resistors 27b and 27c. Reference voltage Vref is applied to each of the series circuits, and the intermediate voltages of the series circuits are directed to an amplifier 29. The output of the amplifier 29 is connected to the base of a transistor 30. The collector and emitter of the transistor 30 are connected to the source of voltage Vh and the heat-generating resistor 4, respectively, thereby forming a feedback circuit. With the above circuit configuration, the temperature Th of the heat-generating resistor 4 is controlled to be greater than the temperature Ta of air flow by a temperature $\Delta T$ (=Th−Ta).

The detector circuit of Embodiment 7 is the same as the bridge circuit 200 of Embodiment 1. The bridge circuit 200 comprises two series circuits connected in parallel. One of the series circuits includes the temperature-sensing resistors 6a and 7a while the other includes the temperature-sensing resistors 6b and 7b. The reference voltage Vref is applied to these series circuits. When the temperature difference QTS arises between the upstream resistors 6a and 6b and the downstream resistors 7a and 7b due to air flow, the resistances of those resistors are caused to change according to their temperatures. This in turn changes the resistance balance of the bridge circuit 200, creating a voltage difference between the two intermediate voltages of the series circuits. Based on this differential voltage, the amplifier 13 produces output Vout which changes according to the flow rate.

The sensor element of Embodiment 7 not only has the advantages of Embodiment 1 but is also advantageous in that less power needs to be supplied to the heat-generating resistor 4 and that the heat-generating resistor 4 can be reduced in size. This increases the latitude in arranging the heat-generating resistor 4 within the diaphragm 2, so that the resistor 4 can be arranged at an advantageous position in terms of temperature distribution correction. Embodiment 7 can be combined with any one of Embodiments 2 to 6, as well as with Embodiment 8 described below.

Embodiment 8

Embodiment 2 of the invention is now described.

Figure 26:
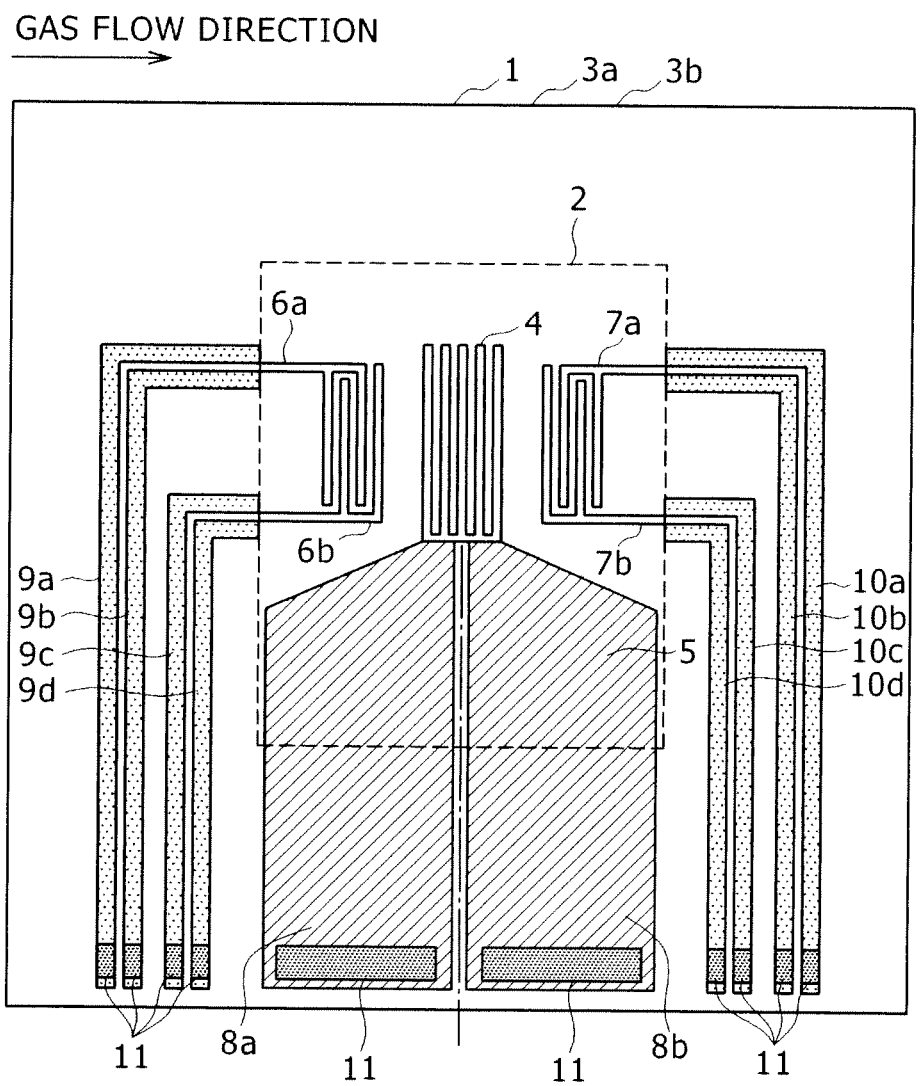
FIG. 26 is a plan view of a sensor element according to Embodiment 8.

FIG. 26 illustrates the structure of the sensor element used in a thermal flowmeter according to Embodiment 8.

The heat-generating resistor 4 of Embodiment 8 is made smaller in line width that the heat-generating resistor 4 of Embodiment 1 (i.e., includes multiple prong-like sections). This increases the density of heat generation per unit area.

The heat-generating resistor 4 can be heated more when it is formed of a metal material such as platinum, molybdenum, tungsten, and nickel alloy. This is because such materials are higher in heat resistance than semiconductor materials such as polysilicon and the like. Note however that further heating of the resistor 4 requires consumption of more power. Thus, to operate the sensor element with small power, voltage, and electric current, the heat-generating resistor 4 should be reduced in size.

The sensor element of Embodiment 8 not only has the advantages of Embodiment 1 but is also advantageous in that the heat-generating resistor 4 can generate more heat due to the increased density of heat generation per unit area and that the resistor 4 can be reduced in size at the same time. This increases the latitude in arranging the heat-generating resistor 4 within the diaphragm 2, so that the resistor 4 can be arranged at an advantageous position in terms of temperature distribution correction. Embodiment 8 can be combined with any one of Embodiments 2 to 7.

It should be noted that while the heat-generating resistor 4 of Embodiment 8 is substantially M-shaped, it could also be formed into a U-shape or meander shape. In that case as well, similar advantages are obtained.

We have stated that, in each of the foregoing embodiments, two pairs of temperature-sensing resistors are arranged between the heat-generating resistor 4 (i.e., the pair of the resistors 6a and 7a and the pair of the resistors 6b and 7b). However, only one of the pairs can instead be used, which of course results in the same advantages of each of the embodiments.

DESCRIPTION OF REFERENCE CHARACTERS

1: Semiconductor substrate
2: Diaphragm
3a, 3b: Insulating film
4: Heat-generating resistor
5: Wiring
6a, 6b, 7a, 7b: Temperature-sensing resistor
8a, 8b, 9a, 9b, 9c, 10a, 10b, 10c, 10d, 28a, 28b, 28c, 28d: Lead-out wires
11: Electrode pad
12a, 12b, 18a, 18b, 18c, 18d, 18e: Temperature distribution
13, 29: Amplifier
14a: Pipe
14b: Air passageway
15a, 15b: Air flow
16: Base section
17: Circuit board
19a, 19b: Isothermal line
20a, 20b: Direction of air flow
21: Thermal resistance adjuster
22a, 22b: Pseudo-wiring section
23: Protective film
24: Thickness change point
25: Thickness boundary
26: Temperature-measuring resistor
27a, 27b, 27c, 110a, 110b, 110c: Fixed resistor
30, 112: Transistor
100, 101: Drive circuit
111: Amplifier
200: Detector circuit All the cited publications, patents, and patent applications are incorporated by reference into this application in their entirety.

The invention claimed is:

1. A thermal flowmeter for measuring the flow rate of gas based on the amount of heat transfer from the gas to temperature-sensing resistors, the flowmeter comprising:
a substrate having a hollow space formed therethrough;
an insulating film deposited on the substrate in such a way as to cover the hollow space;
a heat-generating resistor formed on the insulating film;
temperature-sensing resistors arranged adjacent to the heat-generating resistor;
electrodes arranged at an edge of the semiconductor substrate such that the electrodes are parallel to the edge; and
wiring for electrically connecting the electrodes and the heat-generating resistors,
wherein the thermal resistance of a first area is almost equal to the thermal resistance of a second area, the first area being defined by a first side of the heat-generating resistor closer to the electrodes and by a first side of the hollow space closer to the electrodes, the second area being defined by a second side of the heat-generating resistor opposite the first side of the heat-generating resistor and by a second side of the hollow space opposite the first side of the hollow space.

2. The thermal flowmeter of claim 1,
wherein the wiring extends from the first side of the heat-generating resistor toward the first side of the hollow space,
wherein the thermal resistances of the first and second areas are controlled by adjusting the arrangement of the heat-generating resistor in a longitudinal direction, and
wherein the arrangement of the heat-generating resistor in a longitudinal direction is such that L1>L2, L1 being the distance from the first side of the heat-generating resistor to the first side of the hollow space, L2 being the distance from the second side of the heat-generating resistor to the second side of the hollow space.

3. The thermal flowmeter of claim 2, wherein $L1/L2 \geq 1.5$.

4. The thermal flowmeter of claim 1, further comprising a thermal resistance adjuster provided on the insulating film such that the thermal resistance adjuster is located close to the heat-generating resistor,
wherein the thermal resistance adjuster rectifies the unevenness of the thermal resistances of the first and second areas.

5. The thermal flowmeter of claim 4, wherein the thermal resistance adjuster is located within the second area.

6. The thermal flowmeter of claim 4, wherein the thermal resistance adjuster has a symmetrical shape with respect to a central axis of the hollow space.

7. The thermal flowmeter of claim 4, wherein the thermal resistance adjuster is formed of the same material as the material of the heat-generating resistor.

8. The thermal flowmeter of claim 1, wherein the wiring is arranged on the insulating film such that the wiring is located on one side of the hollow space, and
wherein the thermal flowmeter further includes pseudo-wiring sections located on the other side of the hollow space such that the arrangement of the pseudo-wiring sections and the wiring is symmetrical, thereby adjusting the thermal resistances of the first and second areas.

9. The thermal flowmeter of claim 1,
wherein the thermal resistances of the first and second areas are controlled by adjusting the thicknesses of laminate layers in the first and second areas, and
wherein the average thickness T1 of the laminate layers in the first area is smaller than the average thickness T2 of the laminate layers in the second area.

10. The thermal flowmeter of claim 9, wherein the thickness of the laminate layers changes gradually at the boundary at which the thickness of the laminate layers changes from the average thickness T1 to the average thickness T2.

11. The thermal flowmeter of claim 9, wherein the laminate layers include at least one bent portion at the boundary at which the thickness of the laminate layers changes from the average thickness T1 to the average thickness T2.

12. The thermal flowmeter of claim 1, further comprising:
a temperature-measuring resistor, located on the insulating film, for detecting the temperature of the heat-generating resistor; and
a drive circuit, electrically connected to the heat-generating resistor, for controlling the amount of heat generated by the heat-generating resistor based on the resistance of the temperature-measuring resistor.

13. The thermal flowmeter of claim 1,
wherein the temperature-sensing resistors include a first temperature-sensing resistor located upstream of the heat-generating resistor in terms of the flow of the gas and a second temperature-sensing resistor located downstream of the heat-generating resistor in terms of the flow of the gas, and
wherein the arrangement of the first and second temperature-sensing resistors is substantially symmetrical with respect to the heat-generating resistor.

14. The thermal flowmeter of claim 1, wherein the heat-generating resistor includes at least one bent portion.

15. The thermal flowmeter of claim 1, wherein the heat-generating resistor is formed of a conductive material and generates heat by Joule heating.

* * * * *